Figure 1:
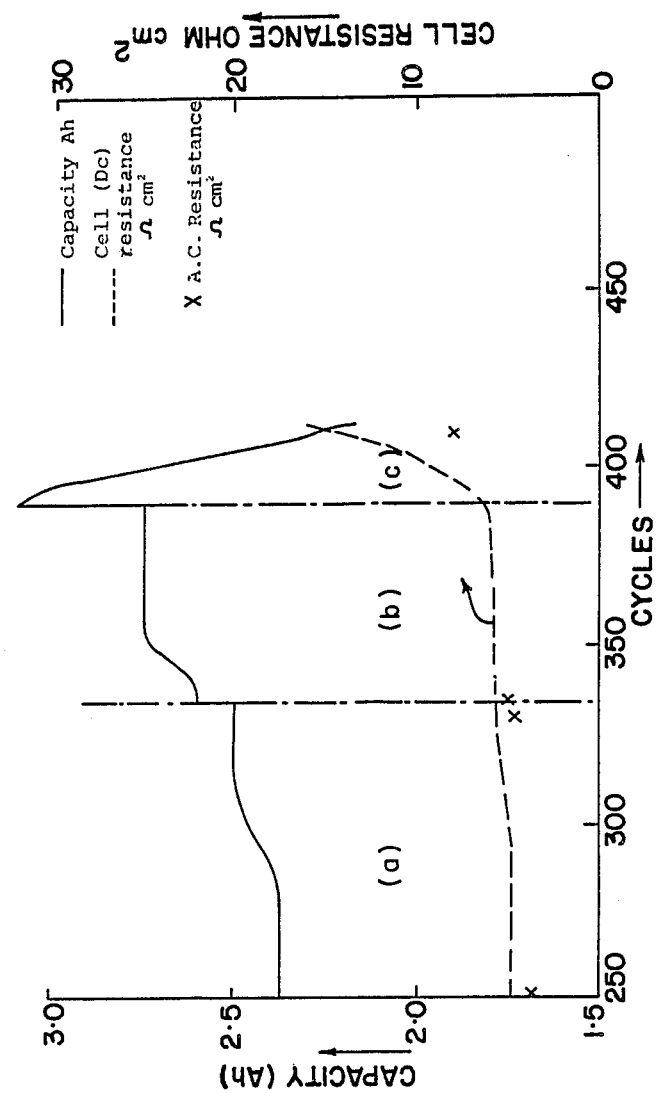

United States Patent [19]

Bones et al.

[11] Patent Number: 4,795,685
[45] Date of Patent: Jan. 3, 1989

[54] ELECTROCHEMICAL CELL

[75] Inventors: Roger J. Bones, Abington, England; Roy C. Galloway; Johan Coetzer, both of Pretoria, South Africa; David A. Teagle, Swindon, England

[73] Assignee: Lilliwyte Societe Anonyme, Luxembourg

[21] Appl. No.: 873,168

[22] Filed: Jun. 11, 1986

Related U.S. Application Data

[62] Division of Ser. No. 765,122, Aug. 13, 1985, Pat. No. 4,612,266, which is a division of Ser. No. 631,905, Jul. 18, 1984, Pat. No. 4,560,627.

[30] Foreign Application Priority Data

Jul. 22, 1983 [GB] United Kingdom ............... 8319749

[51] Int. Cl.$^4$ ........................................... H01M 10/39
[52] U.S. Cl. ..................................... 429/104; 429/103; 429/107
[58] Field of Search ................ 429/103, 107, 104, 221

[56] References Cited

U.S. PATENT DOCUMENTS

| 3,302,091 | 1/1967 | Henderson | 320/48 |
|---|---|---|---|
| 3,877,984 | 4/1975 | Werth | 429/103 |
| 4,287,271 | 9/1981 | Coetzer et al. | 429/103 |
| 4,288,506 | 9/1981 | Coetzer et al. | 429/199 |
| 4,529,676 | 7/1985 | Galloway et al. | 429/103 |
| 4,546,055 | 10/1985 | Coetzer et al. | 429/103 |
| 4,592,969 | 6/1986 | Coetzer et al. | 429/50 |

FOREIGN PATENT DOCUMENTS 1112013  5/1965  United Kingdom .

*Primary Examiner*—John F. Niebling
*Assistant Examiner*—Steven P. Marquis
*Attorney, Agent, or Firm*—Arnold, White & Durkee

[57] ABSTRACT

The invention provides a method of protecting an electrochemical cell which has a molten sodium anode, a chloride-ion containing sodium aluminum halide molten salt electrolyte, an iron-containing cathode in contact with the electrolyte and a solid conductor of sodium ions which separates the anode from the electrolyte, from the adverse effects of overcharging. The method comprises operating the cell, to prevent oxidation of iron to $FeCl_3$ in the cathode, by connecting it in parallel with a protective cell having an open circuit charging plateau at a voltage less than the open circuit voltage of the $Fe/FeCl_3//Na$ plateau of the cell being protected, and greater than the open circuit voltage, in its fully charged state, of the cell being protected. The invention also provides a cell of this type protected in this fashion, a battery including one or more such protected cells, and a cathode for such cells.

9 Claims, 6 Drawing Sheets

ELECTROCHEMICAL CELL

This is a divisional of application Ser. No. 765,122, filed Aug. 13, 1985, now U.S. Pat. No. 4,612,266 which is a divisional of application Ser. No. 631,905, filed July 18, 1984, now U.S. Pat. No. 4,560,627, issued Dec. 24, 1985.

This invention relates to an electrochemical cell. More particularly, the invention relates to a method of protecting an electrochemical cell against adverse effects caused by overcharging thereof, to an electrochemical cell and battery protected in accordance with the method and to a cathode protected in accordance with the method.

According to one aspect of the invention, in an electrochemical cell which comprises a sodium anode which is molten at the operating temperature of the cell, a sodium aluminium halide molten salt electrolyte which contains chloride ions and is molten at the operating temperature of the cell, a cathode which contains iron and is in contact with the electrolyte, and, between the anode and the electrolyte and isolating the anode from the electrolyte, a solid conductor of sodium ions, the iron in the cathode, upon overcharging of the cell, being oxidized at least in part to $FeCl_3$ which is soluble in the electrolyte, there is provided the method of protecting the cell against adverse effects caused by overcharging thereof, which comprises operating the cell connected in parallel with a protective cell having an open circuit charging plateau at a voltage less than the open circuit voltage of the $Fe/FeCl_3$//Na plateau of the cell being protected, and greater than the open circuit voltage, in its fully charged state, of the cell being protected.

By 'isolating' is meant that any ionic sodium moving from the anode to the electrolyte or vice versa, has to pass through the internal crystal structure of the solid conductor of sodium ions.

The method may comprise connecting a separate protective cell, having its own anode, electrolyte and cathode, in parallel with at least one cell to be protected thereby. Instead, the method may comprise building the protective cell into the cell to be protected thereby, the cells sharing a common anode and electrolyte, and the cathode substance of the protective cell being in contact with the electrolyte, the cathode substance of the protective cell oxidizing by chlorination at a voltage less than said open circuit voltage of the $Fe/FeCl_3$//Na plateau. Intermediate situations, where the protective cell and cell being protected have certain parts in common but certain parts separate, are also possible.

When the active cathode substance of the protective cell is in contact with the electrolyte of the cell being protected, as described above, the method may comprise dispersing the cathode substance of the protective cell in finely divided form through the active cathode substance of the cell being protected.

The cathode substance of the protective cell may be selected from the group consisting of $Ni/NiCl_2$, $Co/CoCl_2$ and combinations of $Ni/NiCl_2$ and $Co/CoCl_2$.

Generally, however, $Ni/NiCl_2$ or $Co/CoCl_2$ will be used by itself, rather than a combination.

The cathode of the protected cell may contain free iron which oxidizes to $FeCl_2$ during charging of the cell, and is oxidized to $FeCl_3$ upon overcharging, or, instead, the cathode may comprise one or more compounds of iron which are oxidized by chlorination thereof during charging and which can, upon overcharging, lead to the production of said $FeCl_3$. Examples of said cathode materials are the borides, silicides, nitrides, phosphides, or, particularly, the carbides of iron, which can be present in the cathode alone or in admixtures thereof, and can be admixed with iron in the charged cathode.

The cathode may thus comprise, as the electrochemically active cathode substance of the cell, $Fe/FeCl_2$, the proportions of sodium ions and aluminium ions in the electrolyte being selected so that the solubility of $FeCl_2$ in the electrolyte is at or near its minimum and the protective cell having an open circuit charging plateau at a voltage greater than the open circuit voltage of the $Fe/FeCl_2$//Na plateau of the cell being protected.

The cell may be charged at a substantially constant current, the charging voltage being monitored and charging being discontinued as soon as the charging voltage rises above the $Fe/FeCl_2$//Na plateau, but before it reaches the $Fe/FeCl_3$//Na plateau. Instead, the cell may be charged at a substantially constant voltage, the charging current being monitored and charging being discontinued as soon as the charging current drops below its value on the $Fe/FeCl_2$//Na plateau, but before it drops to the $Fe/FeCl_3$//Na plateau.

According to another aspect of the invention an electrochemical cell comprises a sodium anode which is molten at the operating temperature of the cell, a sodium aluminium halide molten salt electrolyte which contains chloride ions and is molten at the operating temperature of the cell, a cathode which contains iron and is in contact with the electrolyte, and, between the anode and the electrolyte and isolating the anode from the electrolyte, a solid conductor of sodium ions, iron in the cathode, upon overcharging of the cell, being oxidized at least in part to $FeCl_3$ which is soluble in the electrolyte, the cell containing a protective active cathode substance coupled via the electrolyte with the anode, which protective active cathode substance oxidizes by chlorination thereof at a voltage less than the open circuit voltage of the $Fe/FeCl_3$//Na plateau of the cell, and greater than the open circuit voltage, in its fully charged state, of the cell.

The cathode of the protected cell may contain free iron which oxidizes to $FeCl_2$ during charging of the cell, and is oxidized to $FeCl_3$ upon overcharging, or, instead, the cathode may comprise one or more compounds of iron which are oxidized by chlorination thereof during charging and which can, upon overcharging, lead to the production of said $FeCl_3$. Examples of said cathode materials are the borides, silicides, nitrides, phosphides, or, particularly, the carbides of iron, which can be present in the cathode alone or in admixtures thereof, and can be admixed with iron in the charged cathode.

The cathode may comprise, as the electrochemically active cathode substance of the cell, $Fe/FeCl_2$, the proportions of sodium ions and aluminium ions in the electrolyte being selected so that the solubility of $FeCl_2$ in the electrolyte is at or near its minimum, the protective active cathode substance oxidizing by chlorination thereof at a voltage greater than the open circuit voltage of the $Fe/FeCl_2$ plateau of the cell.

The cathode may comprise an electrolyte permeable matrix which is electronically conductive and which is impregnated with the electrolyte, the $Fe/FeCl_2$ being dispersed in the matrix. The protective cathode substance may be in finely divided form, being dispersed through the cathode.

A layer of protective cathode substance may separate the cathode of the cell from the solid conductor of sodium ions, and the protective cathode substance may be selected from the group consisting of Ni/NiCl$_2$, Co/CoCl$_2$ and combinations of Ni/NiCl$_2$ and Co/CoCl$_2$. The cell may have a cathode current collector whose surface comprises said protective cathode substance.

According to yet another aspect of the invention a battery of electrochemical cells comprises at least one protected electrochemical cell having a sodium anode which is molten at the operating temperature of the cell, a sodium aluminium halide molten salt electrolyte which contains chloride ions and is molten at the operating temperature of the cell, a cathode which contains iron and is in contact with the electrolyte, and, between the anode from the electrolyte and isolating the anode from the electrolyte, a solid conductor of sodium ions, the iron in the cathode, upon overcharging of the cell, being oxidized at least in part to FeCl$_3$ which is soluble in the electrolyte, and at least one protective electrochemical cell connected in parallel with the protected cell which has an open circuit charging plateau at a voltage less than the open circuit voltage of the Fe/FeCl$_3$//Na plateau of the protected cell, and greater than the open circuit voltage, in its fully charged state, of the cell being protected.

The cathode of the protected cell may contain free iron which oxidizes to FeCl$_2$ during charging of the cell, and is oxidized to FeCl$_3$ upon overcharging, or, instead, the cathode may comprise one or more compounds of iron which are oxidized by chlorination thereof during charging and which can, upon overcharging, lead to the production of said FeCl$_3$. Examples of said cathode materials are the borides, silicides, nitrides, phosphides, or, particularly, the carbides of iron, which can be present in the cathode alone or in admixtures thereof, and can be admixed with iron in the charged cathode.

The cathode of the protected cell may comprise, as the electrochemically active cathode substance of the protected cell, Fe/FeCl$_2$, the proportions of sodium ions and aluminium ions in the electrolyte of the protected cell being selected so that the solubility of FeCl$_2$ in the electrolyte is at or near its minimum and the protective cell having an open circuit chargin plateau at a voltage greater than the open circuit voltage of the Fe/FeCl$_2$//Na plateau of the protected cell.

The protective cell may be a cell, as described above, which has, in addition to an iron-containing cathode, a protective cathode substance in contact with its electrolyte.

Instead, the protective cell may be a cell which has a sodium anode which is coupled by a suitable electrolyte with a cathode comprising as its active cathode substance, a substance selected from the group consisting of Ni/NiCl$_2$, Co/CoCl$_2$ and combinations of Ni/NiCl$_2$ and Co/CoCl$_2$. The anode of this protective cell may be molten at the operating temperature of the battery, the electrolyte of the protective cell being a sodium aluminium halide molten salt electrolyte which contains chloride ions and is molten at said operating temperature, and there being a solid conductor of sodium ions between the anode and electrolyte which isolates the anode from the electrolyte. The cathode of this protective cell may be impregnated with the electrolyte, comprising the active cathode substance dispersed in an electronically conductive electrolyte permeable matrix.

The invention also extends to a cathode for an electrochemical cell which cathode contains iron and comprises an electronically conductive electrolyte permeable matrix impregnated with a sodium aluminium halide molten salt electrolyte which contains chloride ions, the cathode containing, in contact with the electrolyte, a protective cathode substance which oxidizes by chlorination at a voltage less than the open circuit voltage of the Fe/FeCl$_3$//Na plateau, and greater than the open circuit voltage of the cathode in its fully charges state when coupled with a sodium anode.

The cathode may contain free iron which oxidizes to FeCl$_2$ during charging of the cell, and is oxidized to FeCl$_3$ upon overcharging, or, instead, the cathode may comprise one or more compounds of iron which are oxidized by chlorination thereof during charging and which can, upon overcharging, lead to the production of said FeCl$_3$. Examples of said cathode materials are the borides, silicides, nitrides, phosphides, or, particularly, the carbides of iron, which can be present in the cathode alone or in admixtures thereof, and can be admixed with iron in the charged cathode.

Said cathode may comprise Fe/FeCl$_2$ as its active cathode substance dispersed in said matrix, the protective cathode substance oxidizing by chlorination at a voltage greater than the open circuit voltage of the Fe/FeCl$_2$//Na plateau.

The protective cathode substance may be dispersed in finely divided form through the cathode, and the protective cathode substance may be selected from the group consisting in Ni/NiCl$_2$, CO/CoCl$_2$ and combinations of Ni/NiCl$_2$ and Co/CoCl$_2$.

At a typical operating temperature for cells of the type in question of 250° C., the open circuit voltage of the Fe/FeCl$_2$//Na plateau is about 2.35V, whereas the open circuit voltage of the Fe/FeCl$_3$//Na plateau is about 2.75V. Nickel and cobalt meet the requirement that they should oxidize between these plateaus, as the Ni/NiCl$_2$//Na plateau is about 2.6V at 250° C. and that of Co/CoCl$_3$//Na is about 2.5V at 250° C. NiCl$_2$ and CoCl$_2$, furthermore, cannot be oxidized further at 250° C. at voltages below the 2.75V plateau for Fe/FeCl$_3$//Na at 250° C.

In cells of the type in question, whether they are charged at a constant voltage or at a constant current (the latter being the usual mode of charging) there is a danger, if the voltage exceeds 2.75 volts, that FeCl$_3$ will start to be produced as soon as the cell is fully charged, eg for a cell with an Fe/FeCl$_2$ active cathode substance, when all the active Fe has been oxidized to FeCl$_2$. The invention functions by providing a more or less appreciable delay between the stage when the cell is fully charged, and the stage when FeCl$_3$ starts to be produced.

The applicant has found that, when cells of the type in question are overcharged and FeCl$_3$ is produced, a rapid and unacceptable increase in the internal resistance of the cell takes place, which is appreciable and clearly discernable thereafter. Without being bound by theory, the applicant believes that a major contributing factor to this effect is the formation of FeCl$_3$ upon overcharge, which is appreciably soluble in the liquid electrolyte. This FeCl$_3$ in solution is believed possibly to interact with the solid conductor of sodium ions which separates the liquid electrolyte from the anode, thereby causing said increase in internal resistance. The delay between full charging and the production of FeCl$_3$ provided by the present invention gives rise to a safety interval during which there will be a drop in charging current (during charging at a constant voltage) or an increase in charging voltage (during charging at a constant current), while the protective cathode substance is being oxidized and before FeCl$_3$ is produced, which drop in current or increase in voltage, as the case may be, can be detected and used as a signal to stop charging before FeCl$_3$ is produced.

Thus, for utility during a constant current charging mode, the protective cathode substance should be selected and should be used in such quantity and form, that it is capable of accepting a charge at least as fast as the cathode being protected. This means that once the cell has been fully charged, the oxidation of the protective cathode substance should be capable of absorbing the full charging current for at least some time, before FeCl$_3$ is produced. Sufficient protective cathode substance should thus be used, eg. evenly dispersed throughout the cathode and in a sufficiently finely divided form as described above, to provide adequate area for reaction for a sufficient period. For a cell having an Fe/FeCl$_2$ active cathode substance, nickel and cobalt can be capable of meeting this requirement in quantities of 25% m/m or less of the quantity of active Fe in a fully discharged cell to be protected. In other words, the amount of cobalt or nickel in the fully discharged cell need be no more than 25% m/m of the quantity of active Fe in the cell to be protected. To remain effective for sustained periods or numbers of charge/discharge cycles, the protective cathode substance should remain effectively dispersed and pinned in position in the host cathode structure to be protected. Sodium aluminium halide-type molten salt electrolytes containing chloride ions can be provided in which Co, CoCl$_2$, Ni and NiCl$_2$ are substantially insoluble. Such electrolytes should thus be selected for the above reasons and also in case dissolution of said metals or chlorides may also cause an unacceptable increase in the internal resistance of the cell.

Particularly for cells with Fe/FeCl$_2$ as active cathode substance, the electrolyte is conveniently a sodium aluminum chloride molten salt electrolyte, which can, depending on the proportions of sodium and aluminum, have a melting point of the order of 150° C. or less, and wherein, also depending on its composition, the FeCl$_2$ can be virtually insoluble. This electrolyte may contain a minor proportion of up to, say, 10% by mass and usually less, of a dopant such as an alkali metal halide other than sodium chloride, by means of which its melting point is reduced. The dopant may thus comprise an alkali metal fluoride, but the proportions of the constituents of the electrolyte should be selected such that the solubility of the FeCl$_2$ in the electrolyte is kept to a minimum.

The Applicant has found that the minimum solubility of the FeCl$_2$ in the sodium aluminium chloride electrolyte (which may be doped as described above), occurs when the molar ratio of the alkali metal halide to the aluminium halide is about 1:1. In other words, the relative quantities of said alkali metal ions, aluminium ions and halide ions should conform substantially with the stoichiometric product:

$$M \, Al \, X_4$$

wherein

M represents alkali metal cations; and

X represents halide anions.

Such electrolytes are similar to those described in U.S. Pat. No. 4,287,271, but preferably have sodium as the only alkali metal therein.

This 1:1 molar ratio applies, naturally, when the cell is fully charged. Upon discharge excess NaCl is produced, which is essentially insoluble in the melt and precipitates. Upon charging, it re-dissolves in the melt. As FeCl$_2$ is soluble in aluminium chloride-rich or acid melts, the liquid electrolyte should, when fully charged (i.e. when all the active Fe has been oxidized to FeCl$_2$, but none of the protective cathode substance has necessarily yet been oxidized) contain some excess NaCl. At least sufficient excess NaCl should be present to be consumed as the protective cathode substance is oxidized during a possible overcharge, to prevent the melt from becoming acid before all the additive has been oxidized. The proportion of excess NaCl will thus depend on the amount of protective cathode substance present. This amount, as mentioned above, will in turn be selected so that there is a desired interval between full charging and the production of FeCl$_3$ at the intended or expected typical charging rate for the cell. Naturally, once all the protective cathode substance has been oxidized, the danger that FeCl$_3$ will be produced recurs, as the charging voltage again rises.

Although examples of protective cathode substances have been referred to herein as eg Ni/NiCl$_2$ and Co/CoCl$_2$, it will be appreciated that they will be generally present in the cell in unoxidized form e.g. as Ni and Co, and NiCl$_2$ and CoCl$_2$ will only be present after all the active Fe cathode substance has been oxidized to FeCl$_2$ and overcharging has begun.

Proportions of the constituents of the liquid electrolyte can be selected so that the melting point of the electrolyte at atmospheric pressure is of the order of 140° C. Minor proportions of dopants may be tolerated in the electrolyte, e.g. substances which will ionize in the molten electrolyte to provide ions which affect the electrolytic action of the electrolyte or, as mentioned above, substances which reduce its melting point, but their nature and quantity should preferably be insufficient to alter the essential character of the electrolyte as a sodium aluminium chloride electrolyte, wherein said M Al X$_4$ product is maintained.

When the cell contains a solid conductor of sodium ions, said solid conductor may be beta-alumina or nasicon.

As mentioned above, when the active Fe/FeCl$_2$ of the cell being protected is dispersed in an electronically conductive electrolyte permeable matrix, the Fe/FeCl$_2$ should preferably be evenly dispersed throughout the matrix; and it may be in finely divided particulate form and/or it may adhere as fine particles or a thin layer to the matrix, preferably so that there are no large particles or thick layers of active Fe/FeCl$_2$ present, and preferably so that none of the active Fe/FeCl$_2$ is spaced physically from the material of the matrix, which acts as a current collector, by an excessive spacing, e.g. in large cavities in the matrix. In other words, the active Fe/FeCl$_2$ preferably should be close to or adherent to the material of the matrix, and should be as thinly spread as possible, consistent with the porosity of the matrix and the quantity of active Fe/FeCl$_2$ required to be present. Large particles or thick layers of active Fe/FeCl$_2$ will not prevent the cell from working, but will merely be inefficient, the proportion of the active Fe/FeCl$_2$ remote from the cathode material amounting merely to dead weight. The same considerations apply to the protective cathode substance.

As the electrochemically active cathode substance, Fe/FeCl$_2$ (iron/ferrous chloride) is attractive, for reasons of availability and cost, and because FeCl$_2$ can be substantially insoluble in a sodium aluminium chloride electrolyte in which the molar ratio of sodium chloride to aluminium chloride is 1:1.

The matrix of the cathode in turn can be any suitable electronically conductive substance capable of providing access to the cathode substance of the sodium ions of the electrolyte. Carbon in the form of graphite may be used, or a porous matrix of iron itself can be used. Suitable solid artifacts for use as cathodes can be made from graphite or iron, for use in the cathodes, as described hereunder.

The Fe/FeCl$_2$ of the cathodes of the cell of the present invention can be obtained from iron or from compounds of iron which can be treated to yield the FeCl$_2$, or other chlorides thereof. In each case, the oxidation state of the iron in the metal chloride in the cathode should be as low as possible, and the presence of higher chlorides of the iron should be avoided, so that solubility of FeCl$_2$ in the electrolyte melt is avoided as far as is practicable.

Thus, a sintered artifact can be made of the iron, in a manner similar to that used for the construction of porous iron electrodes. This can then be chlorinated electrochemically, or chemically by reaction with a gas such as chlorine or hydrogen chloride, or with such gas diluted by a suitable diluent.

When electrochemical chlorination is being employed, the cathode so formed can be removed to the cell where it is to be used, or if it is chlorinated in situ, the original composition of the electrolyte should be selected, or the electrolyte should be modified after chlorination, so that the FeCl$_2$ is substantially insoluble therein.

If chemical chlorination has been used, subsequent heating under vacuum can be employed to sublime off unwanted volatiles, such as any FeCl$_3$ obtained in making an Fe/FeCl$_2$ cathode artifact. According to this method of manufacture, the resultant cathode is FeCl$_2$, finely dispersed through a porous matrix of iron, which is an electronic conductor and can be electrochemically active, depending on the cell environment, and can thus further enhance cell capacity.

Instead, a refractory compound of iron, such as a carbide thereof, can be mixed with a small quantity of a carbon-forming binder, e.g. phenol formaldehyde resin. The resulting mix is then pressed into electrode shape and the resin can be cracked in a vacuum at temperatures in excess of 600° C.

Instead, the chloride itself can be finely divided and mixed with a suitable conducting medium for the matrix, such as graphite, and the cathode pressed as an artifact from the mixture.

In each case, prior to assembling the cell, the cathode may be loaded with the electrolyte with which it is to be used, and this can be effected by vacuum impregnation followed by pressurization, to promote complete penetration of the electrolyte into the artifact. Instead, the vacuum impregnation of the electrolyte may take place via a suitable tube after the cell has been assembled.

In each case the protective cathode substance, e.g. Ni/NiCl$_2$ or Co/CoCl$_2$ or a salt such as nickel hydroxide or cobalt hydroxide, may be introduced into the cathode structure during the initial powder preparation stage, subsequent sintering being employed if necessary, to convert the salt to the metal in question, prior to chlorination.

An advantage of cells of the type in question, particularly when several cells are connected in series, is that they are capable of passing current on overcharge. Without protection according to the invention however, these cells suffer from a substantial subsequent increase in internal resistance on overcharge. On the other hand, when such cells are never overcharged to produce FeCl$_3$ (e.g. when the charging voltage is kept at all times not more than 2.65V) they have exhibited a stable low internal resistance for large numbers of cycles (in excess of 720). The present invention acts to retain the advantage of passing current on overcharge, while guarding against the production of FeCl$_3$. In this regard, as the protective cathode substance employed will typically be substantially more expensive than the Fe/FeCl$_2$ employed, it is not intended to use the additive materially to extend the active cell capacity for each cycle, but rather to provide a buffer to cope with marginal overcharges as can occur accidentally occasionally or from time to time, e.g. in cell use in a battery.

To demonstrate the invention certain tests were carried out, as described hereunder.

EXAMPLE 1

Prior Art

A cell was constructed having a molten sodium anode separated from a sodium aluminium chloride (1:1 molar ratio) molten salt electrolyte by a beta-alumina solid electrolyte, and having a cathode comprising FeCl$_2$ dispersed in an electrolyte-permeable, electronically conductive matrix. Such cathode can be made eg by chemically chlorinating a sintered iron artifact with chlorine gas, or by similarly chlorinating an artifact made by pressing in a uniaxial press (34,500 kPa) a mixture of powdered Fe$_3$C with about 10% phenol formaldhyde binder and heating for 3 hours at 1000° C. under argon.

This cell was cycled at about 250° C. for about 340 cycles, being discharged during each cycle at 1.5A and to a minimum voltage of 1.75V and charged during each cycle at 0.3A and up to a maximum voltage of 2.6V (stage a). Thereafter, with charging current, maximum charging voltage and discharge current held constant, it was discharged down to a minimum voltage of 1.7V for each cycle until about 390 cycles (stage b). Finally with discharge current and minimum discharge voltage kept constant at 1.5A and 1.7V respectively, and with charging current kept constant at 0.3A, the maximum charging voltage was raised to 3.0V (stage c). Stages a, b and c are shown on FIG. 1 which is a plot of cycles against cell capacity and against cell resistance.

From FIG. 1 it will be noted that the only material change after the transition from stage a to stage b was the expected increase in cell capacity. However, after the transition from stage b to stage c, cell capacity, after initially rising considerably, fell away rapidly, substantially and irreversibly, together with an equally rapid, substantial and irreversible increase in internal cell resistance. This is believed to arise from an irreversible poisoning of the solid electrolyte at the solid/liquid electrolyte interface by FeCl$_3$ dissolved in the liquid electrolyte, the FeCl$_3$ being produced by overcharging the cell to above the Fe/FeCl$_3$//Na plateau of 2.75V.

Figure 2:
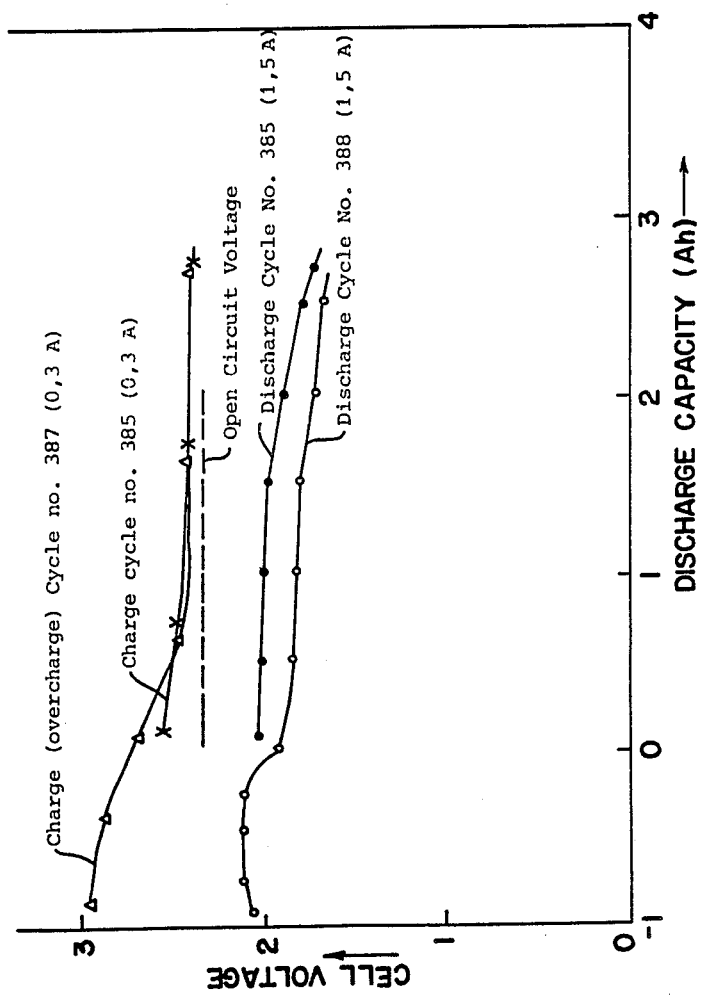

The overcharge in fact took place at the 387th cycle and in FIG. 2 there is shown, for comparative purposes, on a plot of discharge capacity against cell voltage, the charge and discharge curves before and after the overcharge. Thus the charge curve for the 385th and 387th (overcharge) cycles are shown, and the discharge curves for the 385th and 388th cycles, ie a resistance increase.

The charging curves for the 385th and 387th cycles are substantially coincidental (except for the overcharge portion of the 387th cycle) whereas, after the overcharge, the 388th discharge cycle curve shows an immediate and substantial drop in voltage compared with the 385th discharge curve.

EXAMPLE 2

Figure 3:
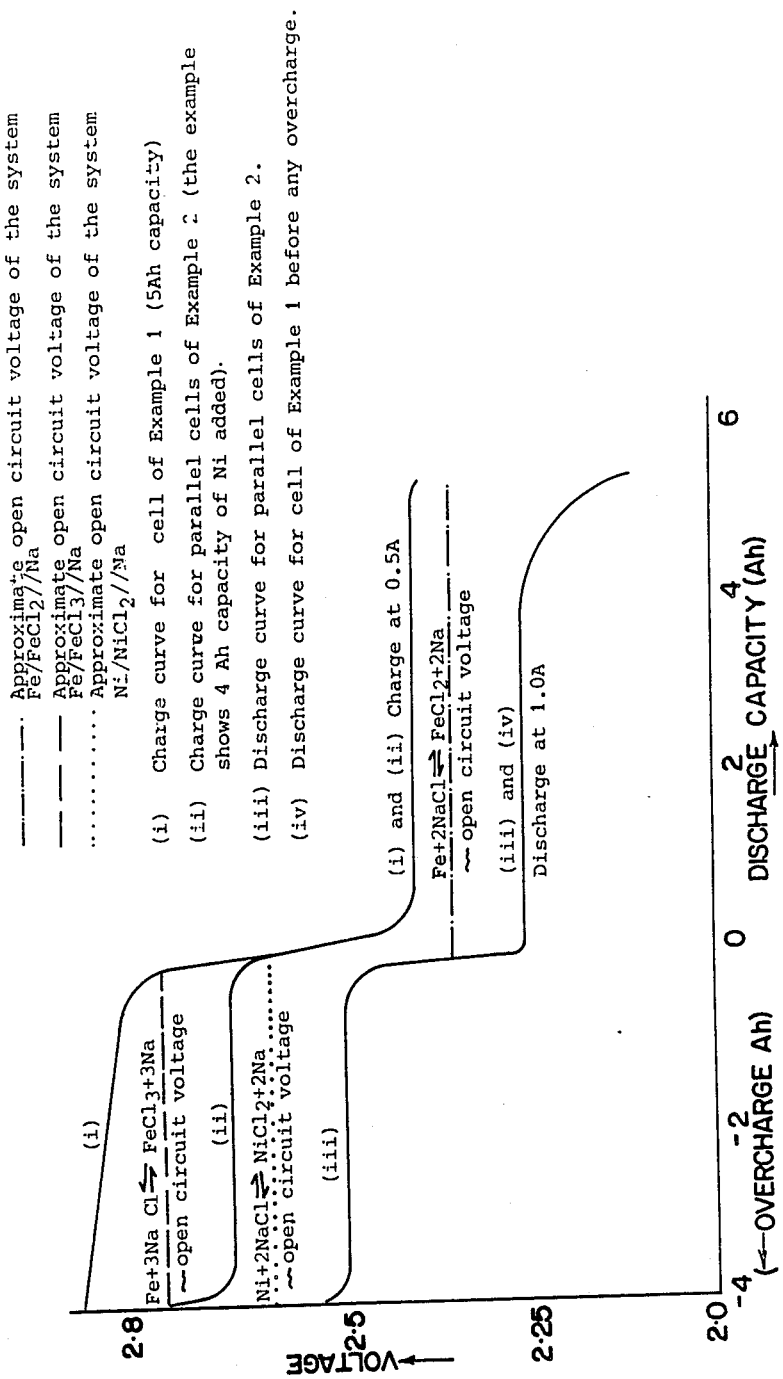

To demonstrate the feasibility of the present invention, a Ni/NiCl$_2$//Na cell can be considered which is constructed in substantially identical fashion to the cell of Example 1, with Ni replacing the Fe of the cell of Example 1. This cell and a cell of the same type as used in Example 1 can be connected in parallel and subjected to charge discharge cycles at 250° C. The results obtainable are shown in FIG. 3, which is a plot of cell capacity against cell volts, the open circuit voltages also being shown and data for overcharging the cell of Example 1, also being shown for comparison. The Ni/NiCl$_2$//Na cell is shown having a capacity of about 4Ah and the Fe/FeCl$_2$//Na cell is shown having a capacity of about 5Ah.

The data shown in FIG. 3 are a close approximation to the behaviour of a cell in accordance with the present invention, i.e. a cell according to Example 1 with 5Ah capacity of Fe/FeCl$_2$ and with 4Ah capacity of Ni/NiCl$_2$ added to the cathode in finely divided evenly dispersed form. Addition of the nickel can thus protect the system from a voltage rise leading to FeCl$_3$ production for a substantial amount of overcharge, depending on the amount of nickel added.

As the Fe/FeCl$_2$//Na system becomes fully charged, further charge (overcharge) takes place at a controlled voltage of less than the 2.75V required to oxidize FeCl$_2$ to FeCl$_3$, while the Ni is being oxidized to NiCl$_2$.

EXAMPLE 3

Example 2 was followed in practice with a Fe/FeCl$_2$//Na cell having a capacity of about 5 Ah connected in parallel with a Ni/NiCl$_2$//Na cell having a capacity of about 2 Ah.

The Fe/FeCl$_2$//Na cell was a mature cell which had been operated at 250° C. for 320 cycles (without being overcharged to 2.6V) and had a stable low resistance and stable capacity. The Ni/NiCl$_2$//Na cell was a similarly mature cell with well characterised stability.

Figure 4:
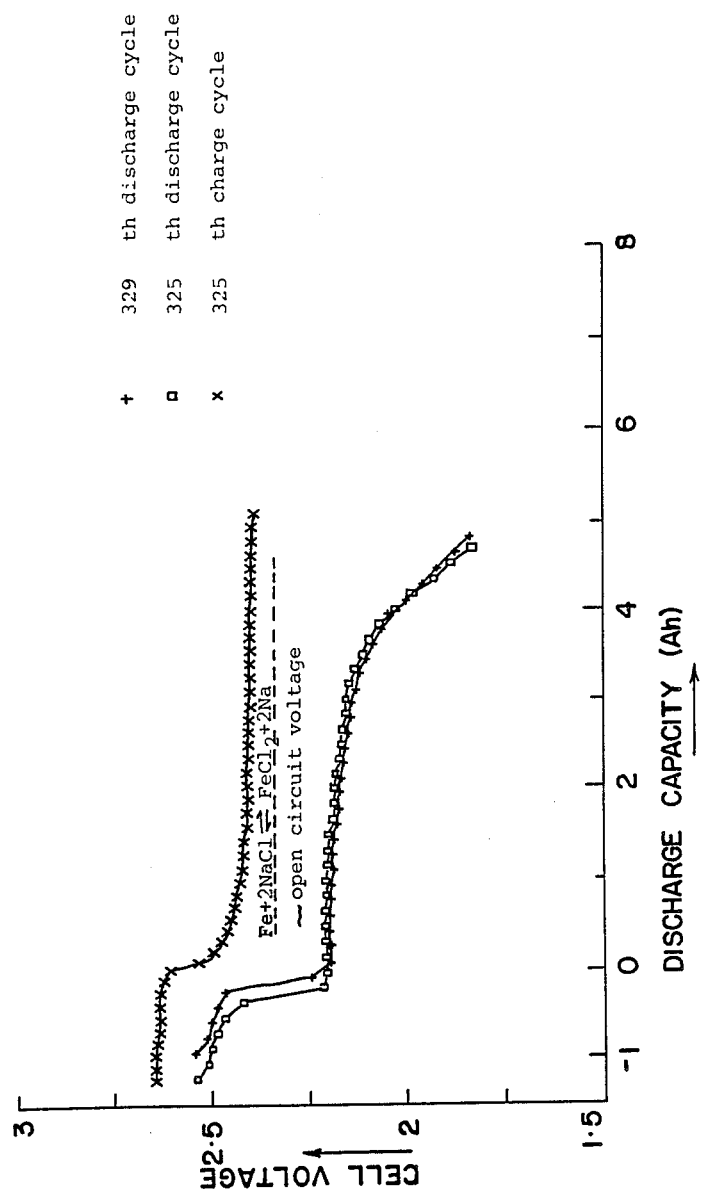

The cell combination was operated continuously, being discharged during each cycle at 1 A and charged at 0.4 A over a 6.5 Ah capacity cycle (i.e. an effective 1.5 Ah overcharge of the Fe/FeCl$_2$//Na cell). Selected half cycles of the cell combination are shown in FIG. 4. Both the Fe/FeCl$_2$//Na and the Ni/NiCl$_2$//Na can be clearly seen on each charge and discharge half cycle. The half cycles in fact shown are for the 325th discharge cycle (for the Fe/FeCl$_2$//Na portion of the cell), for the 325th charge cycle which followed the 325th discharge cycle and which was the first "overcharge" cycle, and for the 329th discharge cycle. The curves for the 325th and 329th discharge cycles show virtually no increase in internal resistance, and this compares very favourably with the curves for the 385th and 388th discharge cycles of FIG. 2.

EXAMPLE 4

A cell was constructed of the type described above in Example 1 wherein the cathode contained an evenly dispersed mixture of Fe/FeCl$_2$ and Ni/NiCl$_2$. The capacity of the Fe/FeCl$_2$ component in the cathode was 7 Ah and the cell, with the Fe/FeCl$_2$ component fully charged and the Ni/NiCl$_2$ component uncharged, contained sufficient excess NaCl in the electrolyte to give the cell a further 3 Ah of capacity upon charging the Ni/NiCl$_2$ component, which was not fully charged by the time the NaCl was exhausted. The cell was operated at 250° C.

Figure 5:
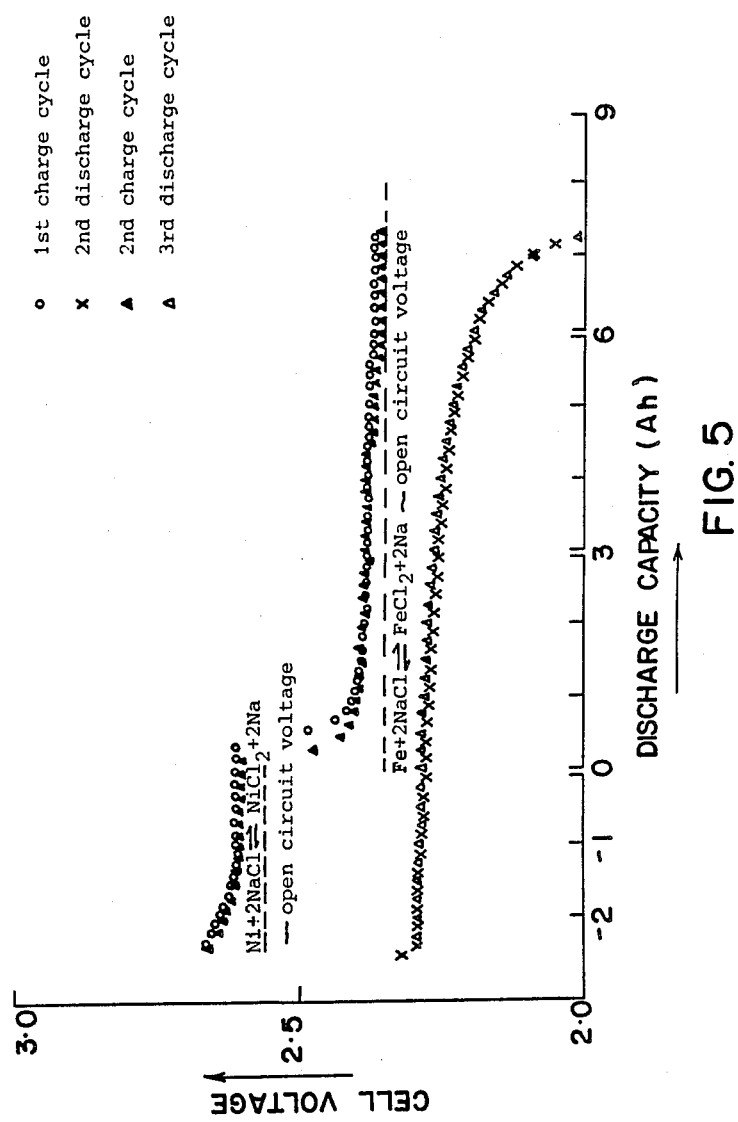

In FIG. 5 the 1st and 2nd charge cycles, and the 2nd and 3rd discharge cycles for this cell are plotted in terms of cell volts against capacity (Ah) at a charging current of 0.2 A and a discharge rate of 1 A (20 mA/cm$^2$). From FIG. 5 is can be seen that there are clearly defined separate Fe and Ni plateaus on the charge cycle curves. Although the Ni/NiCl$_2$ component must discharge first, no clearly defined Ni/NiCl$_2$ plateau was present, and only the Fe/FeCl$_2$ plateau could be detected on the discharge curve. No increase in internal resistance, resulting from the overcharge above an open circuit voltage of 2.35 V in the 1st and 2nd charge cycles, could be observed.

Figure 6:
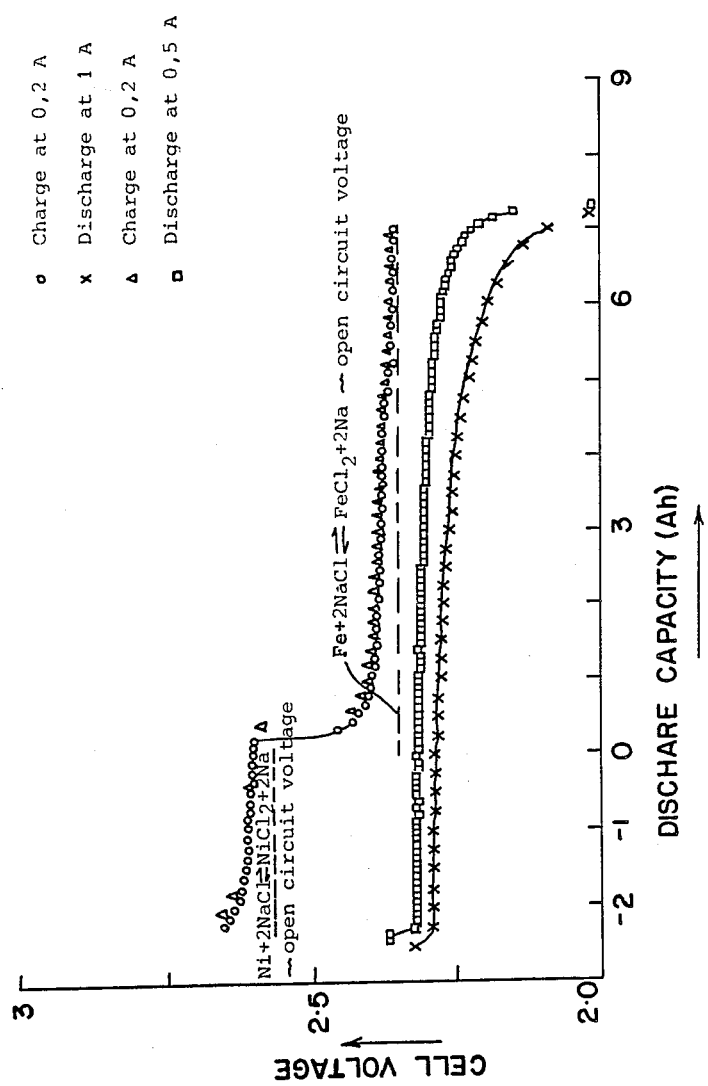

The cell, while it continued to be charged at 0.2 A, had its discharge rate altered to 0.5A. In FIG. 6 are shown two typical charge curves at 0.2 A and two discharge curves respectively at 1 A and 0.5 A, in terms of cell volts against capacity. FIG. 5 shows that although the cell discharged at a higher voltage when discharged at 0.5 A than when discharged at 1 A, the shape of these discharge curves was essentially similar.

The present invention thus can provide cells in which an electrochemical solution, built into the cathode, is provided to the problem of overcharging. Individual cells are each protected, and this is of particular advantage in series/parallel cell arrays in batteries, where the use of Zener diodes or the like external controls are otherwise required to prevent overcharging. Thus in a typical battery containing a plurality of chains or series of cells connected in parallel, the battery being charged at a fixed charging current, when any particular cell is fully charged, its voltage will not exceed about 2.6V until all its Ni has been oxidized to NiCl$_2$, assuming an excess of NaCl. During this period, charging current will preferentially flow through chains connected in parallel with that containing the fully charged cell, and careful monitoring of battery terminal voltage will show the slight increase in this voltage associated with the presence of a fully charged cell, at which stage charging can be stopped before any FeCl$_3$ is produced.

It will further be appreciated that, although the emphasis hereinabove has been placed on protecting a cell of the type in question against overcharge by dispersing a protective cathode substance of the type in question in the cathode, and on cells with a cathode containing such an additive, the invention extends also, as demonstrated by Examples 2 and 3, to a method of protecting one or more cells such as Fe/FeCl$_2$//Na cells of the type in question connected in parallel in a battery against overcharge by connecting in parallel therewith a protective cell which has a charging plateau at a voltage less than the open circuit voltage of the Fe/FeCl$_3$//Na plateau but greater than the Fe/FeCl$_2$//Na plateau of the cells being protected. Ni/NiCl$_2$//Na or Co/CoCl$_2$//Na cells can be used for this function, or indeed a cell protected by containing dispersed protective cathode substance in its cathode, can be connected in parallel with an unprotected cell, thereby to protect it.

We claim:

1. An electrochemical cell which comprises a sodium anode which is molten at the operating temperature of the cell, a sodium aluminum halide molten salt electrolyte which contains chloride ions and is molten at the operating temperature of the cell, a cathode which comprises, as the electrochemically active cathode substance of the cell, Fe/FeCl$_2$, said active cathode substance being metallic iron in the fully discharged state of the cell and FeCl$_2$ in the fully charged state of the cell, the active cathode substance being in contact with the electrolyte, and, between the anode and the electrolyte and isolating the anode from the electrolyte, a solid conductor of sodium ions, the iron which forms the active cathode substance, upon sufficient overcharging of the cell, being oxidizable at least in part to FeCl$_3$ which is soluble in the electrolyte, the cell containing a protective cathode substance coupled via the electrolyte with the anode, which protective cathode substance oxidizes by chlorination thereof at a voltage less than the open circuit voltage of the Fe/FeCl$_3$//Na plateau of the cell, and greater than the open circuit voltage of the Fe/FeCl$_2$//Na plateau of the cell, in its fully charged state, of the cell, a layer of the protective cathode substance separating the cathode of the cell from the solid conductor of sodium ions.

2. A cell as claimed in claim 1, in which the proportions of sodium ions and aluminium ions in the electrolyte are selected so that the solubility of FeCl$_2$ in the electrolyte is at or near its minimum.

3. A cell as claimed in claim 2, in which the cathode comprises an electrolyte permeable matrix which is electronically conductive and which is impregnated with the electrolyte, the Fe/FeCl$_2$ being dispersed in the matrix.

4. A cell as claimed in claim 1, in which the protective cathode substance is in finely divided form and is dispersed through the cathode.

5. A cell as claimed in claim 1, in which the protective cathode substance is selected from the group consisting of Ni/NiCl$_2$, Co/CoCl$_2$ and combinations of Ni/NiCl$_2$ and Co/CoCl$_2$.

6. A cell as claimed in claim 2, in which the protective cathode substance for protecting the cell against formation of FeCl$_3$ upon overcharging, is selected from the group consisting of Ni/NiCl$_2$, Co/CoCl$_2$ and combinations of Ni/NiCl$_2$ and CoCl$_2$ which is coupled via the electrolyte with the anode.

7. A cell as claimed in claim 1, in which the protective cathode substance in its metallic state is present in a minor proportion of at most 25% by mass of the electrochemically active iron present in the fully discharged state of the cell.

8. A cell as claimed in claim 1, in which the proportions of sodium ions and aluminum ions in the electrolyte are selected so that the solubility of FeCl$_2$ in the electrolyte is at or near its minimum, and in which the electrolyte contains, in the fully charged state of the cell, sufficient solid NaCl in contact therewith to permit oxidizing by chlorination of substantially all of the protective cathode substance during overcharging of the cell.

9. An electrochemical cell which comprises a sodium anode which is molten at the operating temperature of the cell, a sodium aluminum halide molten salt electrolyte which contains chloride ions and is molten at the operating temperature of the cell, a cathode which comprises, as the electrochemically active cathode substance of the cell, Fe/FeCl$_2$, said active cathode substance being metallic iron in the fully discharged state of the cell and FeCl$_2$ in the fully charged state of the cell, the active cathode substance being in contact with the electrolyte, and, between the anode and the electrolyte and isolating the anode from the electrolyte, a solid conductor of sodium ions, the iron which forms the active cathode substance, upon sufficient overcharging of the cell, being oxidizable at least in part to FeCl$_3$ which is soluble in the electrolyte, the cell having a cathode current collector whose surface comprises a protective cathode substance coupled via the electrolyte with the anode, which protective cathode substance oxidizes by chlorination thereof at a voltage less than the open circuit voltage of the Fe/FeCl$_3$//Na plateau of the cell, and greater than the open circuit voltage of the Fe/FeCl$_2$//Na plateau of the cell, in its fully charged state, of the cell.

* * * * *